(12) United States Patent
Chardon et al.

(10) Patent No.: US 8,745,024 B2
(45) Date of Patent: Jun. 3, 2014

(54) TECHNIQUES FOR ENHANCING CONTENT

(75) Inventors: Jean-Michel Chardon, Toronto (CA);
Mark Connolly, Stoney Creek (CA);
Rajiv Bansal, Palo Alto, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 13/284,775

(22) Filed: Oct. 28, 2011

(65) Prior Publication Data

US 2012/0278348 A1 Nov. 1, 2012

Related U.S. Application Data

(60) Provisional application No. 61/480,849, filed on Apr. 29, 2011.

(51) Int. Cl.
*G06F 17/30* (2006.01)

(52) U.S. Cl.
CPC .... *G06F 17/30011* (2013.01); *G06F 17/30017* (2013.01); *G06F 17/30026* (2013.01); *G06F 17/3074* (2013.01); *G06F 17/30781* (2013.01)
USPC ........... 707/707; 707/705; 707/708; 707/758; 707/764

(58) Field of Classification Search
CPC ................ G06F 17/30011; G06F 17/30017; G06F 17/30026; G06F 17/3074; G06F 17/30781
USPC ........ 707/641, 705–707, 726, 735, 769, 821; 709/203, 201, 213, 217; 717/106, 107; 725/53, 139
See application file for complete search history.

(56) References Cited

U.S. PATENT DOCUMENTS

| 7,877,328 | B2* | 1/2011 | Tanaka | 705/57 |
| 8,117,590 | B2* | 2/2012 | Kataoka | 717/107 |
| 8,365,140 | B2* | 1/2013 | Heyhoe et al. | 717/106 |
| 2005/0073914 | A1* | 4/2005 | Yabe | 369/30.01 |
| 2008/0184196 | A1* | 7/2008 | Kataoka | 717/107 |
| 2008/0243698 | A1* | 10/2008 | Tanaka | 705/57 |
| 2008/0314232 | A1* | 12/2008 | Hansson et al. | 84/625 |
| 2009/0300580 | A1* | 12/2009 | Heyhoe et al. | 717/106 |
| 2010/0005503 | A1* | 1/2010 | Kaylor et al. | 725/139 |
| 2010/0169414 | A1* | 7/2010 | Pavot et al. | 709/203 |
| 2012/0036538 | A1* | 2/2012 | Kudelski et al. | 725/53 |
| 2012/0128334 | A1* | 5/2012 | Cheok et al. | 386/278 |
| 2013/0212556 | A1* | 8/2013 | Heyhoe et al. | 717/106 |

\* cited by examiner

*Primary Examiner* — Frantz Coby
(74) *Attorney, Agent, or Firm* — Kilpatrick Townsend & Stockton LLP

(57) ABSTRACT

Systems and methods enhance content from one source with content obtained from another source. Information about content, such as content that is or will be experienced by a user, is used to identify the content from another source. The content from the other source may be content of a different type than the content being enhanced. The content from the two (or more) sources are combined and provided simultaneously. The combined content may be provided using a set of one or more electronic devices.

25 Claims, 10 Drawing Sheets

TECHNIQUES FOR ENHANCING CONTENT

CROSS-REFERENCES TO RELATED APPLICATIONS

This application incorporates by reference for all purposes the full disclosure of U.S. application Ser. No. 13/284,668, entitled "Remote Control System for Connected Devices," and filed concurrently herewith. This application also incorporates by reference the full disclosure of U.S. Application No. 61/480,849, entitled "Remote Control for Connected Devices," and filed on Apr. 29, 2011.

BACKGROUND OF THE INVENTION

Content can be provided from various sources. Video content, for example, can be provided from a cable or satellite television provider, from a video streaming service, from local sources such as video recording equipment and local storage devices that store video content. Audio content similarly can be provided from various sources, such as from local storage devices, audio streaming services, radio, and the like. Providing content to users may utilize one or more devices, such as televisions, audio-video (AV) receivers, personal computers, and the like. Providing content from such devices, however, often leaves the devices individually and/or collectively under utilized. Televisions, for example, often include speaker systems that enable the televisions to play audio. A user may, for example, listen to a compact disk (CD) using a digital video disk (DVD) player that is connected to the television or the television may receive an audio signal from another source, such as a personal computer. A television that is used to play audio, however, may leave a screen unutilized.

In many instances, devices are connected together in a network. An AV receiver may, for instance, connect several content-providing devices to a television and/or an audio system. The AV receiver may receive signals from one device and transmit those signals to one or more other appropriate devices. The AV receiver may, for instance, receive an audio and video signal from a DVD player and transmit the video signal to a television while sending a signal to one or more speakers that cause the speakers to play sound according to the audio signal. When such an AV receiver is used simply for the playing of audio, a television or other display device in a network may go unutilized.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques of the present disclosure provide for the effective utilization of consumer electronic devices in a way that enhances the content those devices provide. In one embodiment, a computer-implemented method of providing content is described. The computer-implemented method includes obtaining information associated with first content of a first content type where the first content is from a first content source. The information may be, as an example, metadata of a file that encodes the first content. The computer-implemented method also, in this embodiment, includes identifying, based at least in part on the obtained information, a content set comprising a plurality of content instances for at least one second content source and causing a set of one or more consumer electronic devices to collectively and simultaneously present the first content and at least some of the second content.

Numerous variations are considered as being within the scope of the present disclosure. For example, the first content may be audio content and/or the identified content set may include a plurality of images. In embodiments where the identified content set includes a plurality of images, presenting the first content and at least some of the second content may include sequentially displaying the images while presenting the first content. Variations regarding the various content sources are also considered as being within the scope of the present disclosure. For example, in an embodiment, the first content source and/or the second content sources may be local data stores. One of the first content source or second content source may be a remote data store, such as a data store accessible by a service provided using a public communications network. In addition, variations regarding the types of devices used to provide content are possible. For example, the computer-implemented method may be performed by a television, which may include memory and one or more processors that execute instructions stored in the memory to execute an application that causes the television to perform the method. The computer-implemented method may also be performed by a device separate from a television that obtains the first content and second content and causes at least one of the first content and second content to be displayed on the television.

In accordance with another embodiment, another computer-implemented method of providing content is described. The computer-implemented method, in this embodiment, includes obtaining information about first content, such as described above. The computer-implemented method also includes identifying, based at least in part on the obtained information, second content, where the second content is configured to change over time when presented. In addition, the computer-implemented method includes causing a set of one or more consumer electronic devices to collectively and simultaneously present the first content and second content.

As above, variations of the computer-implemented method are considered as being within the scope of the present disclosure, including variations described above and others. In some embodiments, for example, the first content may be audio content and/or the second content may be video content. The method may further include obtaining the first content and second content from different sources, such as different local sources, different remote sources, or from a combination of at least a remote source and a local source. For example, one of the first content and second content may be obtained from a local source while the other of the first content and the second content may be obtained from a remote source. The obtained information may include tags associated with the first content in a data store. For example, the information may include metadata of a file that encodes the first content. The processes above, as noted, may be performed with the participation of one or more devices. For example, in an embodiment, the computer-implemented method is performed under the control of a television, such as described above. In such an embodiment, causing the set of one or more consumer electronic devices to present the first content and second content may include displaying at least one of the first content and second content on the television. As above, the computer-implemented method may be performed under the control of one or more other devices. In an embodiment, the one or more computer systems are communicatively connected with a display device and causing the set of one or more consumer electronic devices to present the first content and second content includes providing the first content and second content to the display device for display. The computer-implemented method may also include identifying a recommendation for third content, which may be part of the second content.

In accordance with yet another embodiment, a system for providing content is described. The system includes one or more processors and memory including instructions executable by the one or more processors that, when executed collectively by the one or more processors, cause the system to provide content. The system may, for example, match first content from a first content source selected by a user with second content from a second content source, the second content source being a local content source of the user. The system may then cause the first content and second content to be provided to the user simultaneously. Such a device may be a television, a device separate from the television, and/or a combination of devices that collectively work together to provide content.

In an embodiment, causing the first content and second content to be provided to the user includes causing a television to display at least one of the first content and second content. The system and the television may be the same device or separate devices or the television may be a component of the system. Matching the first content with the second content may include obtaining metadata of the first content, causing a search to be performed based at least in part on the obtained metadata, and obtaining one or more results of the performed search that identify the second content. As above, the first content and second content may be from various sources. For instance, the first content and/or the second content may be content generated by the user. Also, the system may identify the second content in various ways. For instance, the system may be configured to maintain an index of a collection of content. Matching the first content to the second content may include identifying the second content using the index.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
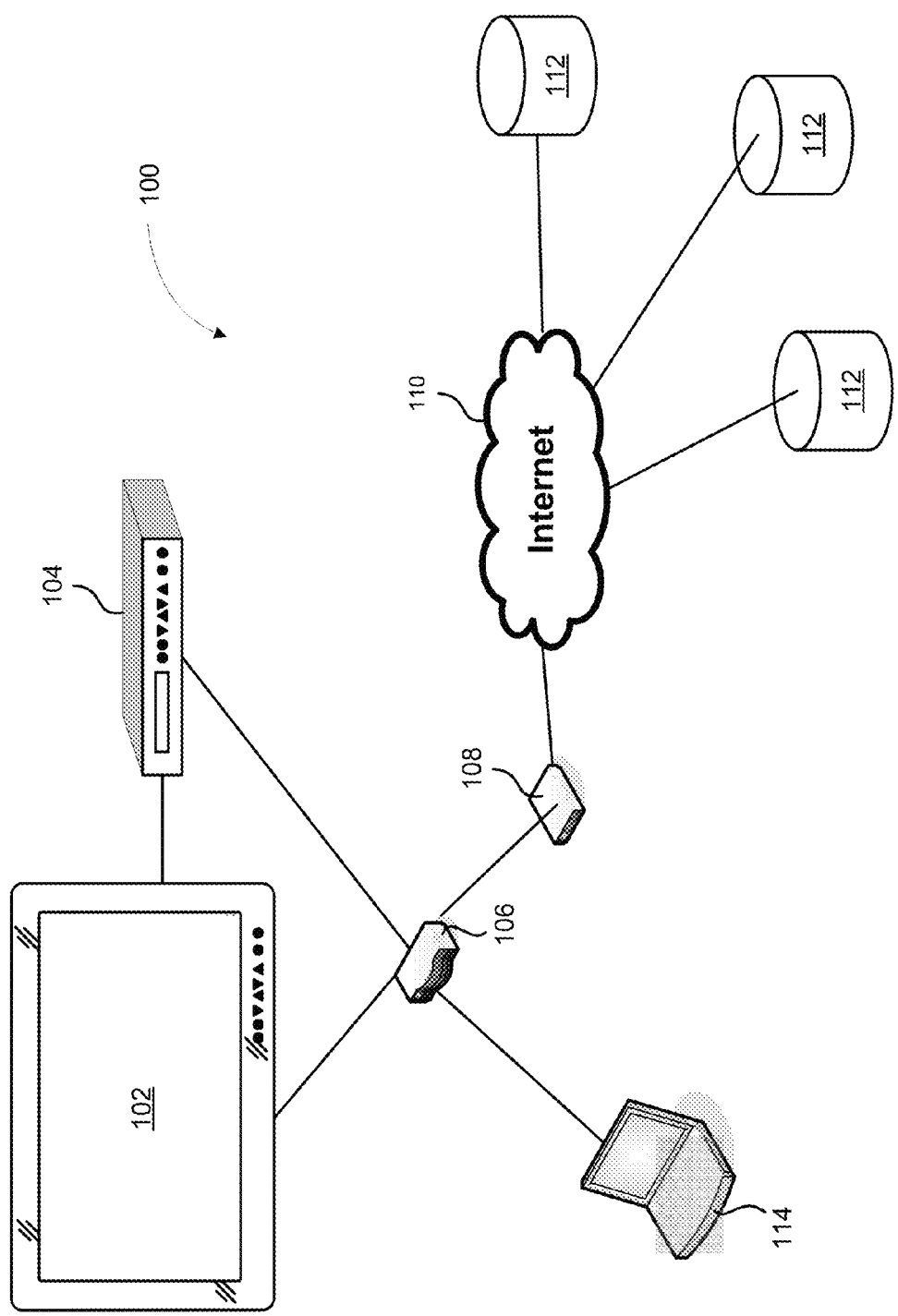
FIG. 1 shows an illustrative example of an environment in which various embodiments may be practiced.

FIG. 1 shows an illustrative example of an environment 100 in which various embodiments may be practiced. Environment 100 in this particular example includes a plurality of devices locally and communicatively connected with one another. The devices may be, for example, consumer electronic devices of a user in the user's home or other location. The devices may also be other devices that work in connection with consumer electronic devices. In this specific example, the environment includes a television 102 that is communicatively connected with a content device 104 and a router 106. By two devices being communicatively connected with one another, at least one of the devices is able to send information to the other device over a wired or wireless connection using an appropriate protocol. It should be noted that, by being communicatively connected with one another, communications between one device and another may be transmitted through one or more intermediate devices.

In the example environment shown in FIG. 1, the content device 104 may be any device which provides content to be displayed or to be otherwise provided to a user. For example, the content device 104 may be a DVD player, a set top box, a digital video recorder (DVR), a CD player, a gaming system or generally any device which provides signals to the television 102 to enable the television 102 to display content accordingly. Signals provided from the content device 104 to the television 102 may also include signals for audio as well. It should be noted that the environment 100 shows a signal content device 104 for the purpose of illustration, but that, generally, an environment may include multiple content devices such as those listed above. Furthermore, the environment 100 shows devices being connected with one another in a particular way, although other configurations are also considered as being within the scope of the present disclosure. For example, while not shown in FIG. 1, the content device 104 may be connected with the television 102 directly to provide the television 102 a video signal while the content device 104 may connect with an audio-video receiver (AVR) to provide the AVR an audio signal. In this manner, content may be provided through using multiple devices. Generally, any suitable manner for connecting consumer electronic devices may be used.

As noted above, as illustrated in FIG. 1, the television 102 is connected with a router 106. In various embodiments, the manner in which the television 102 is connected with the router 106 may vary according to various factors such as user preferences and capabilities of the television 102. For instance, television 102 may include wireless capabilities that allow the television 102 to communicate directly with the router 106, utilizing a wi-fi protocol. The television 102 may also include an Ethernet port that allows the television 102 to be connected with the router 106 with a wired connection. It is to be noted that the various devices shown in FIG. 1 may communicate with each other using any wired or wireless protocols, such as, but not limited to, wi-fi, bluetooth, RF, USB, Firewire, etc. As noted above, the environment in FIG. 1 is simplified for the purpose of illustration and other devices may be included. For instance, in various embodiments, the television 102 may not itself be configured to communicate with a router 106. In such embodiments, an intermediate device (not shown) may be used to receive information from the router 106, and translate information into a video and/or audio signal that the television 102 is able to process. An example of such a device is discussed below in connection with FIG. 11.

In an embodiment, the router 106 is connected with a modem 108 that is configured to access information over a public communications network such as the Internet 110. The modem may be, for example, a digital subscriber line (DSL) modem, a cable modem, a fiber optic modem, or generally any device that is capable of obtaining information from one or more devices over a public communications network. While shown as separate devices in FIG. 1, the router 106 in modem 108 may be a single device. It is also possible for the content device 104 to include a router/modem. Generally, devices illustrated and discussed herein may be combined and functions described being performed by a device may be performed by different devices and, in many instances, some functions may be collectively performed by multiple devices.

In an embodiment, the content from various remote information resources 112 are accessed and provided to the television 102. The information resources 112 may be third-party content services such as websites, audio streaming services, video streaming services, remote storage solution services, and generally any type of content-related service accessible over a public communications network. As just one example, one of the information resources 112 may be a video streaming service. A user using a user interface of a television may cause a signal to be sent through the router 106, modem 108, and Internet 110 to request a particular video from the information resource 112. The information resource, in response, may then stream information over the Internet to the television 102 to be displayed to the user.

Also shown in FIG. 1 is a personal computer 114 in communication with the router 106. The personal computer 114 can be used for various purposes, such as the access and display of content. For example, the personal computer 114 may perform many of the functions described as being performed by the television 102. The personal computer 114 may also be a local information resource for the television 102. For example, electronic photographs may be stored on a storage device of the personal computer 114. The television 102 may obtain electronic photographs from the personal computer 114 through the router 106 and the electronic photographs may then be displayed on the television 102. While not shown as such, the television 102 could also be directly connected with the personal computer 114. As another example, electronic music content such as a Mp3 files, videos, etc. may be stored on a storage device of the personal computer 114. In a similar manner, the electronic audio files may be played utilizing a speaker system of the television 102 or another device for playing audio. Generally, the personal computer 114 may be a resource of any type of content which may be provided in a manner that utilizes the television 102.

While the environment 100 shown in FIG. 1 shows various examples of devices that may be used in accordance with various embodiments, other devices may also be used. Such devices include, but are not limited to, remote control devices, tablet computing devices, external storage devices, mobile telephones, and generally any device configured to control, provide and/or play content.

Figure 2:
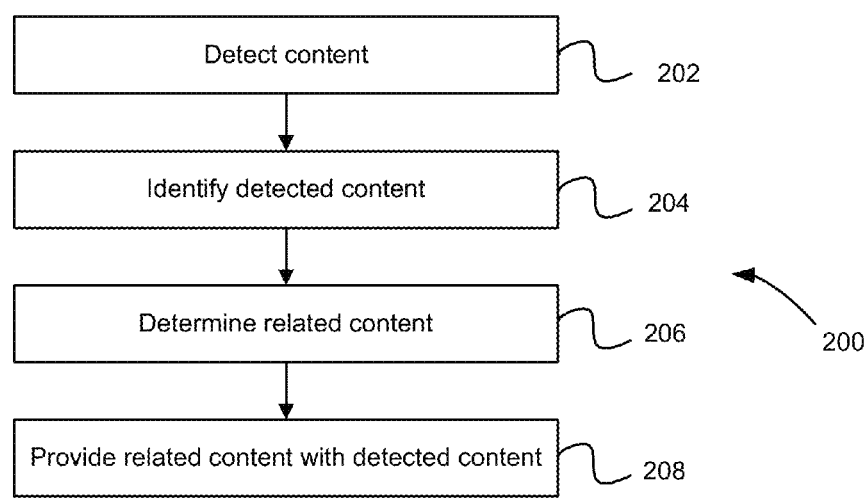
FIG. 2 shows an illustrative example of a process for providing content in accordance with at least one embodiment.

As noted above, various embodiments of the present disclosure are related to combining content to users. FIG. 2 accordingly shows an illustrative example of a process 200 that may be used to provide content in accordance with at least one embodiment. Some or all of the process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. One or more of the actions depicted in FIG. 2 (or depicted and/or described in connection with other figures described herein) may be performed by a device such as a television or other display device, a device in communication with a television, or any device that participates in the providing of content to a user. Actions may also be performed collectively by multiple devices. The code may be stored on a computer-readable storage medium, for example, in the form of a computer program comprising a plurality of instructions executable by one or more processors. The computer-readable storage medium may be non-transitory.

In an embodiment, the process 200 includes detecting 202 content. Detecting content 202 may be performed in various ways, which may depend on the various embodiments in which content is detected. For example, detecting content may be performed upon a user selection of content. The user selection may be, for instance, made using a user interface that allows the user to select content the user wishes to consume (i.e., view, listen to, and the like). Content may be detected in other ways. For example, specific instances of content may not have been selected by the user, but nevertheless are provided to the user. As an example, an audio streaming service may select content for the user, possibly based at least in part on one or more user-specific criteria (such as genre, artist, year, and the like). As another example, a user may select a particular radio channel or television channel. Content may be provided to the user from a radio or television channel operator independent of any input of the user. In any event, when a user does not specifically designate content, whatever content is provided may be detected. Thus, if a particular song is streamed to the user, the song may be detected. If a show is displayed on a television, the show may be detected. More than one instance at a time may also be detected. For example, if a user selects or is provided with a playlist comprising multiple instances of content, the playlist may be detected. Other ways of content additional to those illustrative examples herein are also considered as being within the scope of the present disclosure.

Content may be detected by a system used by the user to select the content. As one example, if a user launches an application to play music, and music is played accordingly, such content may be detected. Similarly, if a user launches an application to view a slideshow of electronic photographs, such may be detected. Content may be detected by another system that participates in a network of devices, such as shown in FIG. 1.

When the content is detected, in accordance with an embodiment, the detected content is identified 204. As with other steps described here in connection with FIG. 2, identifying the detected content may be done in many ways. In an embodiment, identifying the content includes matching the content to one or more identifiers of the content. The identifiers may be (but may not be in some embodiments) unique identifiers for the content or a portion thereof. For example, if the content is a song, an identifier of the song may be identified. If the content is a collection of songs, such as an album or a playlist, identifying the content may include determining an identifier of the album or playlist and/or one or more identifiers of the contents of the album or playlist. The identifiers, as noted, may not be unique. For instance, identifying detected content may include identifying information about the content, such as a genre, publication date, artist, album, and the like. Generally, an identifier may be any piece of information that allows for use of the identifier to obtain additional content, as described below.

In the example where the detected content is a song, various techniques may be used to identify the song. For example, if the song is being played from an Mp3 file, the Mp3 file may include metadata that provides identifying information of the song, such as that described above. Similarly, a video file may have such metadata. Other techniques for identifying the detected content may also be used, including various content recognition techniques that do not necessarily utilize metadata. Content may be analyzed, for example, using an algorithm that determines a digital finger print or other descriptor of the content. The descriptor may be used to reference a database that associates descriptors with specific pieces of content. User input may also be used to identify content. A user may specify through an interface, for example, that a particular piece of content is a home movie. The user may further specify a location of the home movie, people appearing in the movie, and/or other information.

Once the detected content is identified 204, in an embodiment, the content related to the identified content is determined 206. Various examples of related content are provided herein. For example, if the detected content is one or more electronic photographs, the related contents may be one or more audio files that may be played along with display of the photographs. Similarly, if the content is music, the related content may be electronic photographs. The related content may also be a video that is determined to be related to the content. In many instances, the related content may be a type of content different from the content that was detected. For example, electronic photographs are a type of content different from music. However, in other instances, the related content may be the same type of content. For instance, if the detected content is electronic photographs, the related content may be additional electronic photographs that are related to photographs that were detected and identified. In an embodiment, once the related content is determined 206, the related content may be provided 208 with the detected content. It is to be noted that detected content and the related content may be from different sources. For instance, referring to FIG. 1, the detected content may be an audio file being played on a CD player, while the related content may be photographs on the personal computer 114, or video content on a remote server 112. Alternately, the detected content and the related content may be from the same source. For instance, audio files and photographs may all be on the personal computer 114. Returning to FIG. 2, in various embodiments, providing 208 the related content with the detected content is performed by providing the related content and detected content simultaneously. Various examples of such are provided below.

Figure 3:
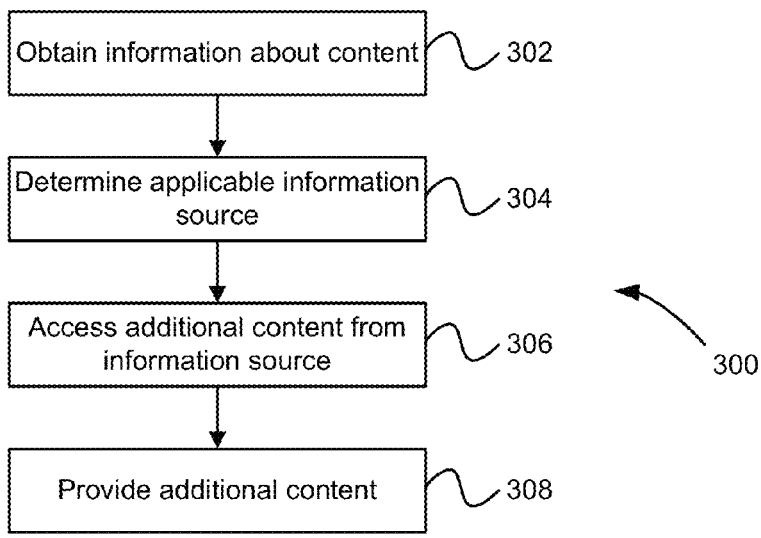
FIG. 3 shows an illustrative example of a process for identifying related content in accordance with at least one embodiment.

FIG. 3 shows an illustrative example of a process 300 that may be used to identify related content such as in connection with the process 200 described above in connection with FIG. 2. In the embodiment illustrated in FIG. 3, the process 300 includes obtaining 302 information about content. Obtaining information about content, as noted, may be done in various ways. For example, obtaining information about the content may be performed by accessing metadata about the content. As another example, as discussed above, one or more algorithms may be applied to content to determine a digital fingerprint descriptor or other piece of information that is unique or likely unique to the content. Such information may be referenced in a database which may be a remote database that associates descriptors with the content. Generally, obtaining the information may be performed in any suitable manner. In an embodiment, the process 300 includes determining 304 an applicable information source. Determining an applicable information source may be performed in various ways. For example, the applicable information source may be determined based on the type of content for which information was obtained. Each type (photograph, audio, video, etc.) may be associated with a corresponding information source. For example, photographic content may be associated with a source of audio content. Audio content may be associated with a source of video content and/or a source of photographic content. Determining the applicable information source may take into account user preferences that the user has set, according to accounts has with third-party services, and the like. Determining the applicable information source may also take into account user behavior. For example, an information source frequently accessed by the user may be determined as the applicable information source. In addition, determining the applicable information source may include selecting the applicable information source from a plurality of applicable information sources.

Once the applicable information source has been determined 304, additional content from the information source is accessed 306. Accessing the additional content from the information source may be performed in any suitable way. For example, if the information source is a local information source, such as a personal computer or external storage device, the additional content may be accessed over a home network. Similarly, if the information source is a third-party service, accessing the additional content may be performed by accessing the content from the third-party service over a public communications network such as the Internet. Once the additional content from the information source has been accessed 306, in an embodiment, the additional content that has been accessed is provided 308. Providing the additional content may be performed, for example, by providing the additional content to a device or a process executed within a device that can process the content accordingly, such as by combining the additional content for which information was obtained. If applicable, providing the additional content may be performed by providing the additional content to multiple devices that collectively provide the content to the user.

Figure 4:
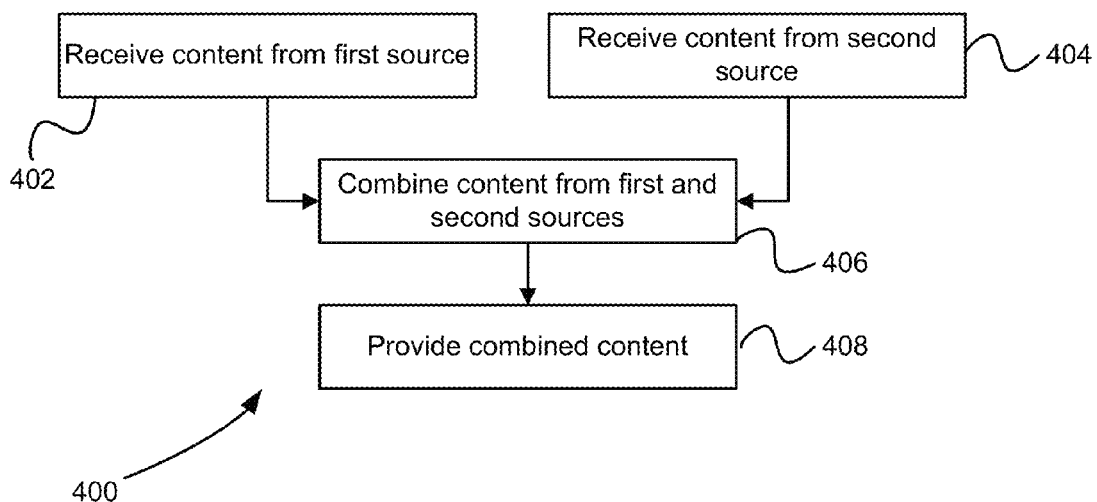
FIG. 4 shows an illustrative example of the process for combining content in accordance with at least one embodiment.

FIG. 4 shows an illustrative example of a process 400 for combining content from various sources in accordance with an embodiment. The process 400 described in connection with FIG. 4 may be used, for example, in connection with FIG. 2 in order to provide related content with detected content as described above. As illustrated in FIG. 4, the process 400 includes receiving content from a first source 402. The first source, as noted, may be a local information source or a remote information source. The process 400 also in this example includes receiving 404 content from a second source. A second source may be the same source as the first source, or may be a different source. For example, the content from the first source may be received from a local device and the content from the second source may be from a remote device such as a remote server that operates in connection with a content service. In an embodiment, the content from the first and second sources is combined 406. Various examples of combined content are provided below. Finally, the process 400, as illustrated herein, includes providing the combined content such as providing the content on a device or collection of devices collectively configured to provide the content. For example, the device may be a television and the collection of devices may be a television in connection with an audio-video receiver. Of course, other devices and combinations thereof are considered as being within the scope of the present disclosure.

Figure 5:
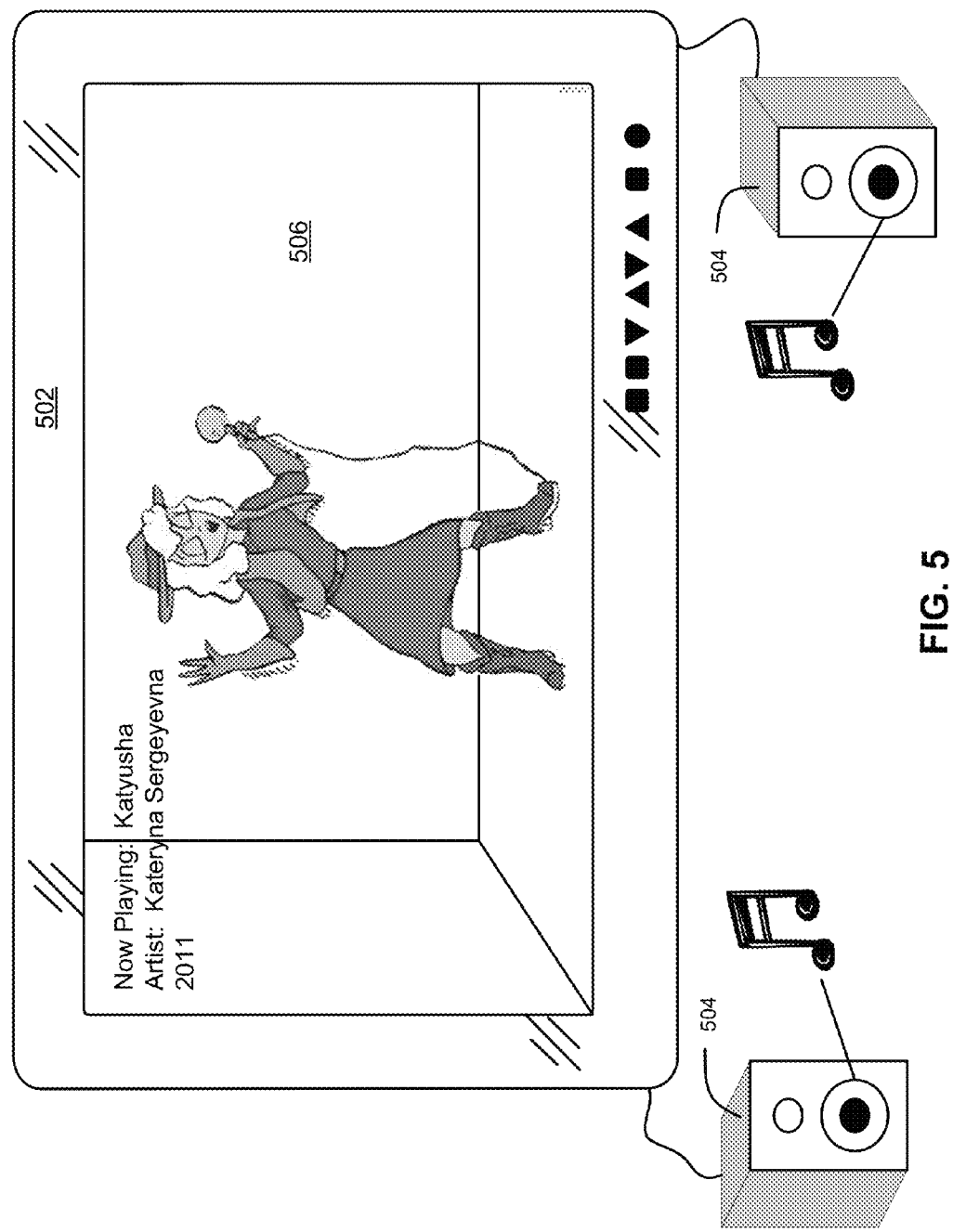
FIG. 5 shows an illustrative example of how content may be provided in accordance with at least one embodiment.

FIG. 5 shows an illustrative example of how content may be combined in accordance with an embodiment. FIG. 5, in this example, shows combined content utilizing a television 502. As illustrated in FIG. 5, the television 502 is used to play music through speakers 504 connected with the television 502. As noted, audio may be provided from another device different from the television 502. While the television 502 plays music through the speakers 504, a video may appear on a screen 506 of the television 502. The music and video may have been provided from different sources such as in accordance with the above description. As one example, a user may have decided to listen to this particular piece of music (or may have selected a playlist that includes the music or has taken one or more actions that resulted in the music being streamed or otherwise provided to the user) and, as a result, a video related to the music was identified, obtained, and played concurrently with the music. The video may have been obtained, for example, from a third-party remote video streaming service. The video may also have been obtained from a local storage device on which the video is stored.

It should be noted that the video need not be a video that is synchronized with the music, but may be video that is just determined to be related to the music. For example, while FIG. 5 shows a video of a person singing, the video may be, for example, scenes from a movie of which the music is part of a soundtrack, from a home movie taken by the user (or another user), or another video that is not necessarily a video of the music being performed. It should be noted that the combined content as illustrated in FIG. 5 may have been obtained in other ways different from described above. For instance, the user may have decided to view the video (or may have selected a playlist that includes the video or has taken one or more actions that resulted in the video being streamed or otherwise provided to the user). The music may have then been selected to match the video. If the video has its own audio, the audio of the video may be overridden by the selected music.

Figure 6:
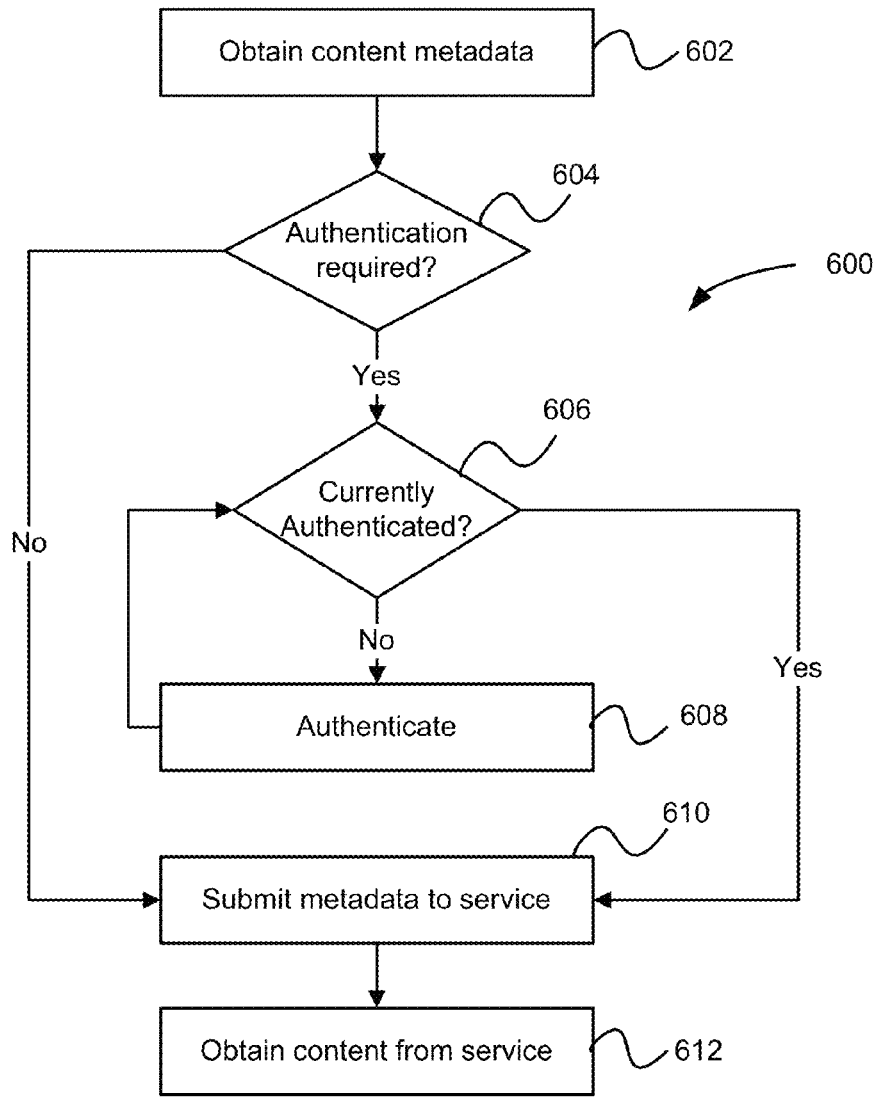
FIG. 6 shows an illustrative example of a process for obtaining additional content from a service in accordance with at least one embodiment.

FIG. 6 shows an illustrative example of a process 600 that may be used to obtain additional content from a remote service. In this example, the process 600 includes obtaining content metadata 602. The content metadata may be encoded, for example, by a file that additionally encodes the content. For example, Mp3 files often include metadata tags that provide various information about music files such as an artist, an album, the year, and other information. In an embodiment, a determination is made 604 whether authentication is required for the service for which content is to be obtained. For example, the service may be a paid service or a service that generally requires user registration prior to providing content. If authentication is required, then a determination may be made 606 whether the user is currently authenticated. If the user is not currently authenticated, then authentication may be performed 608 and a determination may be made again whether the user is currently authenticated. Authenticating the user may be done in any suitable manner, such as providing a user name and password of the user to the service for authentication. Generally, authentication can be performed in any way and with or without user intervention. For example, a user name and password may be stored in a storage device and user may not be required to participate in authentication every time authentication is required. Similarly, authentication may be performed by passing a session token that was previously generated to the service for use during a session. A session token may include information that allows the service to determine that the user is currently authenticated—for example, because a token is valid and not expired. Once it is determined 606 that the user is currently authenticated, or determined 604 that authentication is not required, then the obtained metadata may be submitted 610 to the service. The service may then utilize the metadata to identify content, based on the metadata, and such content may be obtained 612 from the service. For example, the service may send the content over the Internet. It should be noted that, while FIG. 6 illustrates providing obtained metadata to a service, information may be derived from the metadata and the derived information may be provided to the service. For instance, metadata may be normalized to a format that is acceptable by the service. Generally, any manner of providing information about the content to the service may be used.

Figure 7:
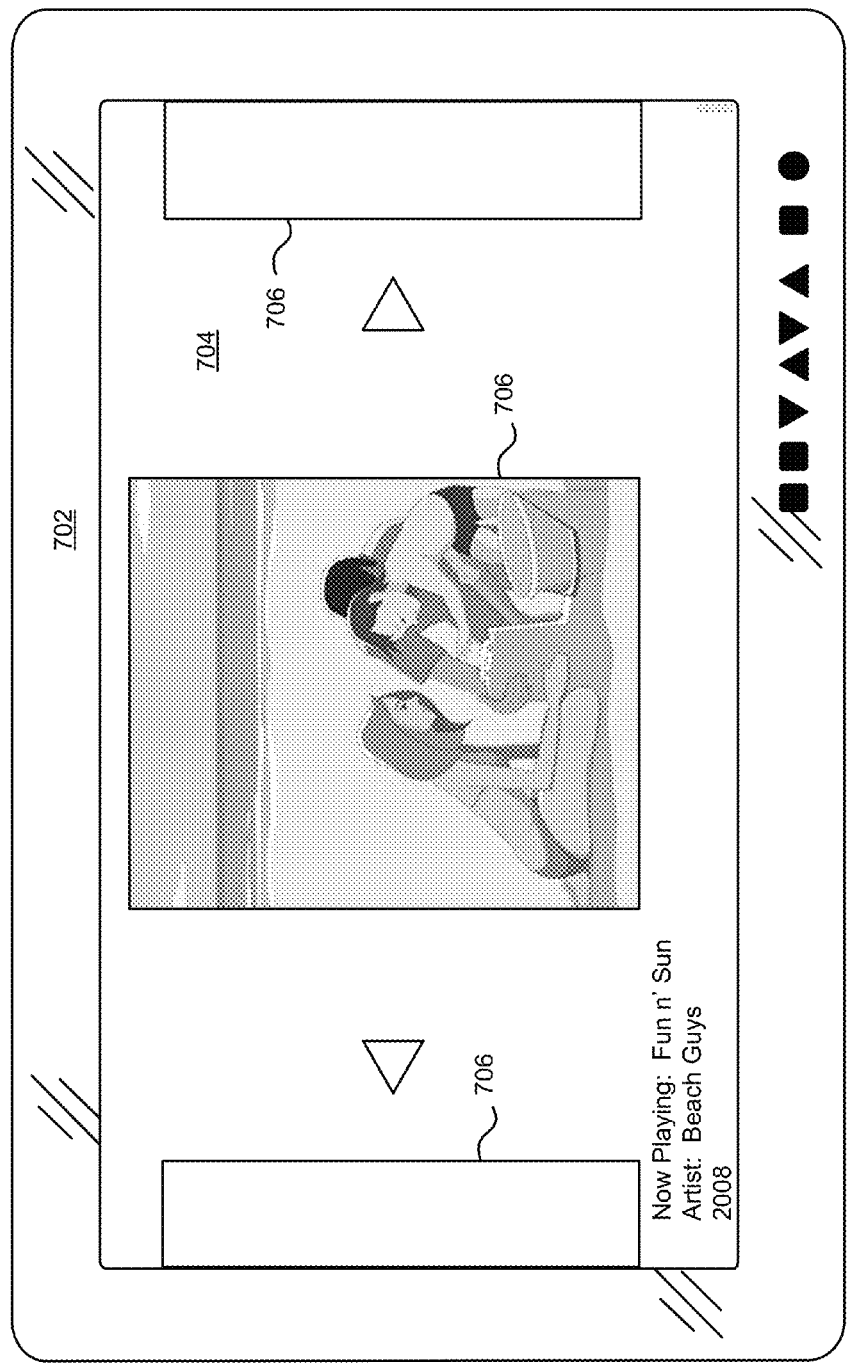
FIG. 7 shows an illustrative example of how content may be combined in accordance with at least one embodiment.

Metadata or other information about content may be used by a service in various ways to provide content related to the metadata. For example, FIG. 7 shows an example of how content may be identified based at least in part on metadata and provided accordingly. In this particular example, a television 702 is illustrated with a screen 704. A slideshow of electronic photographs 706 is displayed. As indicated in the lower left corner of the screen 704, music is also playing in connection with the slideshow (e.g., by the television 702 or an audio system operating in connection with the television). Metadata of one of the electronic photographs or the music may be used to identify the other. For example, the electronic photographs of the slideshow may include date information that corresponds to a date when the electronic photographs were captured by a capture device (such as a digital camera, a mobile phone or other device with built-in camera, or other device). The date information may be used to identify music that was released at approximately the same time or that is otherwise associated with the time of the photograph.

For example, as shown in FIG. 7, music currently playing was released in 2008. The pictures of the slideshow may have been captured during or around the year 2008. Other metadata may also be used. For example, many electronic photographs include metadata that shows a location where a photograph was captured. Metadata may include, for example, global positioning service (GPS) coordinates that were encoded in the electronic photographs by a device that captured the electronic photographs. Such a device may, for example, have GPS capabilities and therefore may be able to provide such metadata. Metadata may also be provided in other ways such as through automated techniques and/or by user input of such metadata. For example, users may supply tags for content and the user-supplied tags may be used in the various embodiments. For example, a user may tag a photograph or set of photographs with "beach" and/or "sun." Music that has been associated with "sun," "beach," and/or other related terms may be identified for presentation with the photograph(s) accordingly. Similarly, as another example, a user may have supplied a caption of "family at the beach" for a photograph or set of photographs. The caption may be used to identify related music accordingly. Other metadata, such as tags, comments, or other information provided by other users, such as a community of users of a social network or other community to which the content is accessible may be used.

In the example of FIG. 7, geographic metadata (supplied automatically or otherwise) may have been used to identify music that is related to the geographic location. On this particular example, the slideshow currently shows an electronic photograph 706 of a family at the beach. Accordingly, a service may utilize geographic data from the photograph (or a collection of photographs that includes the photograph) to identify music that has been associated with the beach. A device of the user may have accessed the geographic metadata, provided the geographic metadata to a service over a public communications network, and, in response, received music identified by the service or information identifying the identified music.

As noted, metadata may be used in other ways as well. For example, the above description of FIG. 7 is described with an illustrative example where photographs are used to identify related music. The content illustrated in FIG. 7, however, may have been determined in other ways. For example, the user may have selected the music that is illustrated as playing (or a playlist or other collection that includes the music) and metadata of the music may have been used to identify photographs for the slideshow, such as by submitting the metadata or information derived therefrom to a service that identifies the photographs based at least in part on information received. The service may be a remote service (such as a service operated in connection with an online photograph sharing service) or a local service, such as an application on a device of a user that is configured to select photographs based at least in part on received information.

In this example of identifying photographs from music, for instance, metadata for a music file for which the music is playing may indicate a date of 2008. One or more electronic photographs may be identified from a local source or from a remote photograph storage service. The photographs identified may be associated with the year 2008. For example, they may have been captured in 2008. The photographs may be photographs that an owner of the television 702 has himself or herself taken or they may be photographs that are provide by unrelated entities, such as publicly available photographs obtained from a third party service. Combinations of user-made and third-party-provided photographs may be used.

Figure 8:
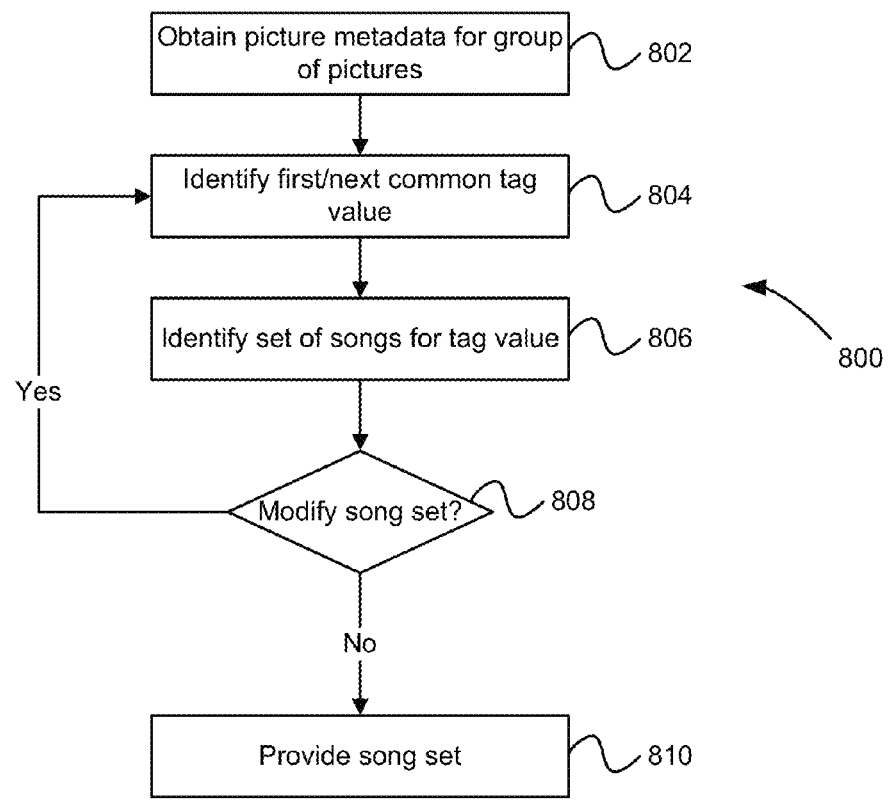
FIG. 8 shows an illustrative example of a process that may be used to provide content in the manner illustrated in FIG. 7 in accordance with at least one embodiment.
Figure 9:
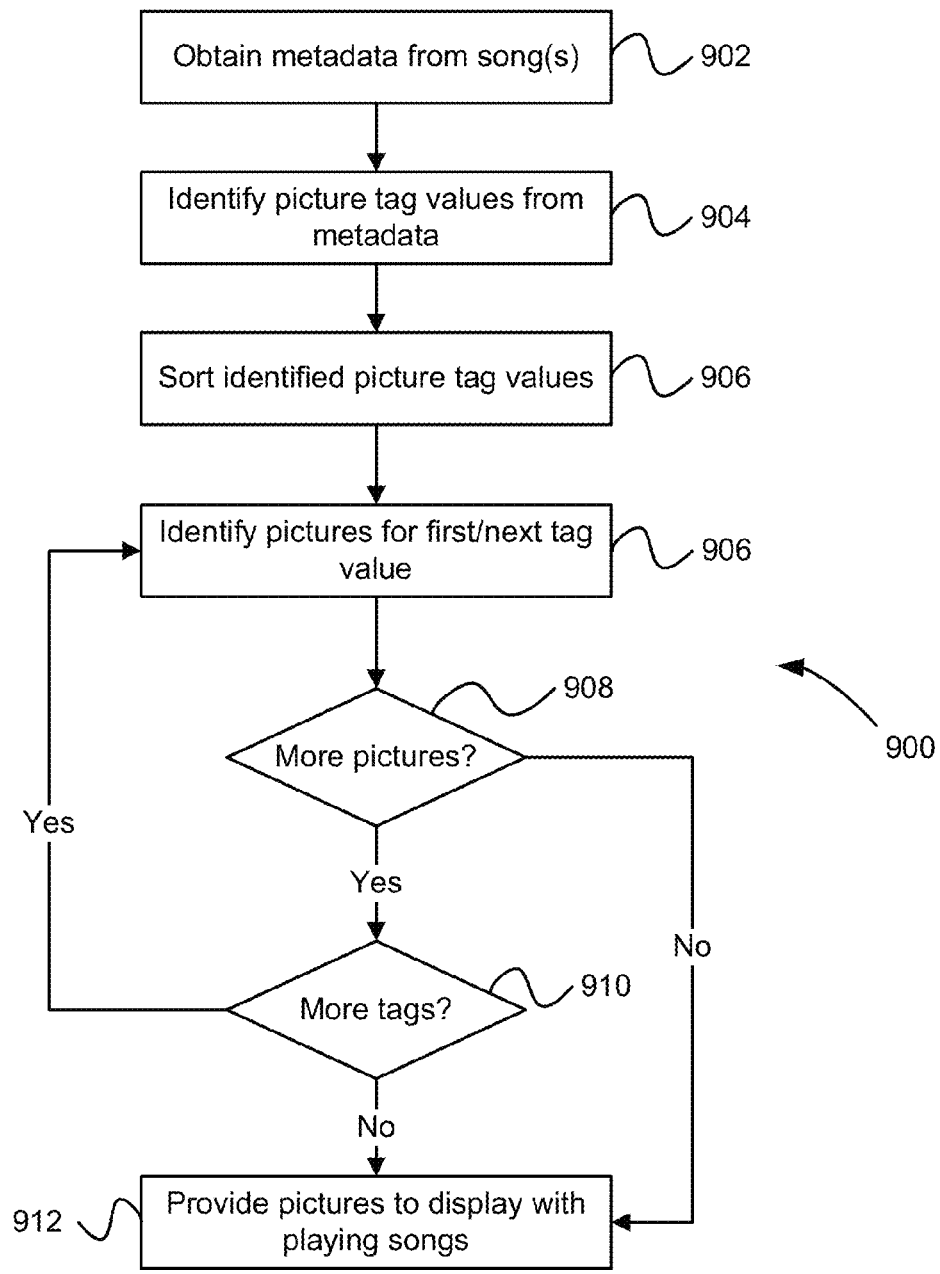
FIG. 9 shows an illustrative example of another process that may be used to provide content in the manner illustrated in FIG. 7 in accordance with at least one embodiment.

FIGS. 8 and 9 respectively show processes 800 and 900 that may be used to generate a presentation of content such as illustrated in FIG. 7. In particular, FIG. 8 shows a process 800 for identifying music to play with photographs while FIG. 9 shows a process for identifying photographs to play with music. Beginning with FIG. 8, in an embodiment, the process 800 includes obtaining picture metadata for a group of pictures. The group of pictures, for example, may be a group of pictures selected by a user for a slideshow presentation. The pictures may be selected from a group of pictures stored locally on a device of the user, stored remotely, or include both locally and remotely stored pictures. Generally, the group of pictures may be any set of one or more pictures. A picture may be, for example, an electronic photograph.

In an embodiment, the process 800 includes identifying 804 a first common tag value. Generally, a group of pictures may have metadata tags that vary among them. For example, the pictures may have different dates, different geographic coordinates, been taken by different devices, and the like. Identifying the first common tag value may be performed, for example, by identifying a tag that is most common among the group of pictures or that is within a range of values that encompasses a number of pictures. For example, the common tag value may have been identified because some or all of the pictures have date metadata that corresponds to the pictures that have been taken in a year. Similarly, the common tag value may be GPS coordinates of a location near which the photographs were captured. Generally, the first common tag value may be any value determined to relate to the group of pictures. It should be noted that the first common tag value may be, but does not necessarily, correspond to an actual tag value of any of the pictures. For example, the pictures may have metadata tags of specific dates (and possibly times). A common tag value may be simply a year in which some or all of the dates fall. Further, while the process 800 (and other processes) is described in terms of "a value," variations may be used. For example, a range of values or ranges of values may be identified. A location may, for example, be defined by a range of GPS coordinates that includes some or all of the coordinates of the group of pictures.

Selecting the first common tag value may include statistical analysis of the tag values of the group of pictures. Different groups of pictures may have substantially different characteristics. Pictures of a family vacation, for example, may include date tag values within a relatively small range of dates. A slideshow of a person's life, on the other hand, may include date tag values that cover a wide range of dates. Therefore, in many instances, it may be desirable to use a date tag value for selecting additional content for the pictures of the family vacation because the pictures roughly correspond to the same point in time. A date tag value for the slideshow of the person's life, on the other hand, may not be useful for the group as a whole since the dates widely vary. Accordingly, distributions of tag values of the pictures may be used to determine which type of tag value should be selected. For a plurality of tag types (e.g. date, location, etc.), tag values of the type may be fitted to a distribution (such as a normal distribution) and a variance may be calculated. A tag value for the type with a lower variance may be selected. Certain tag types may be excluded from this comparison, such as tag types determined to be of little use for identifying additional content. For example, a tag type that identifies the ISO settings of a digital camera or a model of the digital camera may be excluded.

When a tag type is determined, a common tag value may be identified in various ways, depending on the tag type. For tag types corresponding to numerical values, an average, median, or other statistical measure may be the common tag value. For tag types corresponding to other value types (such as discrete, non-numerical types), a common tag value may be selected as the most common value of the tags of a type.

In an embodiment, a set of one or more songs is identified 806 for the identified tag value. The tag value may be used, for example, to reference a data store that associates the tag values with songs. As just one illustrative example, the tag value is a year value (such as 2008, as illustrated), and songs within that year may be identified. Other information may also be used to identify the songs. For example, user preferences may indicate that a user prefers one style of music over another style of music. Songs from the preferred style may be then selected. A determination may be made 808 whether to modify the song set. For example, if there are too many songs, additional data may be used to refine the set to be more specific. If there are not enough songs, songs may be added.

Accordingly, if it is determined 808 to modify the song set, a next common tag value is identified 804 and a set of songs for the identified common tag value may be then identified 806. The set of songs for the next common tag value may be identified from the set that was identified in the previous iteration of the process 800. For example, if a first iteration identified songs from a particular year, the second iteration may identify songs from that year that are also associated with a particular geographic location. As noted, the next tag value may be used to identify additional songs. For instance, if the first iteration identified songs from a particular year, the next tag value may be used to identify additional songs that are associated with a particular geographic location. Once it is determined 808 that the song set does not need to be refined, the song set may be provided 810. Providing a song set may be done by providing the audio files themselves or by providing information identifying the audio files so that the audio files may be retrieved.

As with any process describe and suggested herein, variations are considered as being within the scope of the present disclosure. For example, FIG. 8 above describes a process in which tag values for a group of pictures are used to identify songs for the group as a whole. The process 800 may be modified in various ways. In one embodiment, for example, the process 800 (or a variation thereof) is used to determine a song for subsets of a set of pictures. The songs identified for the subsets may then be combined. As a specific illustrative example, if the pictures are from a wide range of dates, songs may be identified for some of the dates within the range. If the pictures were for a slideshow of a person over a period of time, as an example, the slideshow may be presented such that, when pictures of a particular year are displayed, corresponding music is played. Thus, older pictures may be played with older music.

As noted, the presentation of FIG. 7 may be obtained in various ways. As noted, FIG. 9 shows the illustrative example of the process 900 that may be used to identify pictures to be displayed with a song, such as a song that has been selected by the user for playing. As with any process described herein, variations are considered as being within the scope of the present disclosure. For example, while the process 900 is described in terms of identifying pictures for a song, the process 900 may be used to identify pictures for a group of songs, such as a playlist, album, or other collection of audio content instances.

In an embodiment, the process 900 includes obtaining metadata from one or more songs. The songs may be, for example, one or more songs that have been selected by a user for playing. Multiple songs may be, for instance, from a playlist selected by the user. In an embodiment, the process 900 includes identifying 904 picture tag values from the metadata that was obtained from the songs. Identifying the picture tag values may be performed in any suitable manner such as using techniques described above. The identified picture tag values may be sorted 906. (While not illustrated as such, tag values may be determined and sorted in the process 800 as well.) In this example, the picture tag values may be sorted in any suitable manner, including a random manner. Sorting, for example, may be performed according to a number of songs that correspond to each tag value. Once the picture tag values have been sorted, in an embodiment, the process 900 includes identifying 906 pictures for the first tag value.

A determination may be made 908 whether additional pictures are needed. A determination may be made in any suitable manner such as based on a slideshow speed and a number of pictures that have been obtained compared to a total length of the songs for which the metadata was obtained. The determination may also be made on other factors, such as a predetermined value for a number of pictures which may be based on a user specification of such value. If it is determined that more pictures are needed, a determination may be made whether there are more tags that may be used to identify additional pictures. If there are, then pictures for a next tag value may be identified 906. This process may repeat, as illustrated in FIG. 9, until it is determined that either more pictures are not needed or there are no more tags which can be used to identify additional pictures. When it is determined that more pictures are not needed or there are no more tags which can be used to identify additional pictures, the pictures may be provided to display with the songs as they play. The pictures may be, for example, picture files that may be provided themselves or information identifying the picture files that may be provided so that a device playing the songs may also display the pictures.

It should be noted that other actions may be taken in various instances. For example, if it is determined that more pictures are needed, but there are no more tags from which pictures may be identified, pictures may be selected randomly or in another manner. For instance, if pictures have been obtained from a particular file on a user computer, pictures that have not been identified from the file, but are nevertheless still in the file may be additionally identified. As another example, in some instances, too many pictures may be identified. In such instances, the process 900 may include refining a set of pictures that have been identified. Identifying the set of pictures may be done in any suitable manner. For example, pictures may be analyzed for blurriness and pictures determined as blurry may be discarded from the set. As another example, pictures may be randomly selected from the set. As yet another example, every nth (e.g., 3rd) picture from the set may be selected. Pictures may also be selected to avoid pictures that were captured around the same time. Pictures may be selected, for instance, to avoid selecting pictures that were taken within some predetermined length of time as another selected picture. In this manner, if many pictures in a row are taken of the same subject, it is less likely that highly similar pictures will appear in a slideshow constructed using the process 900.

Figure 10:
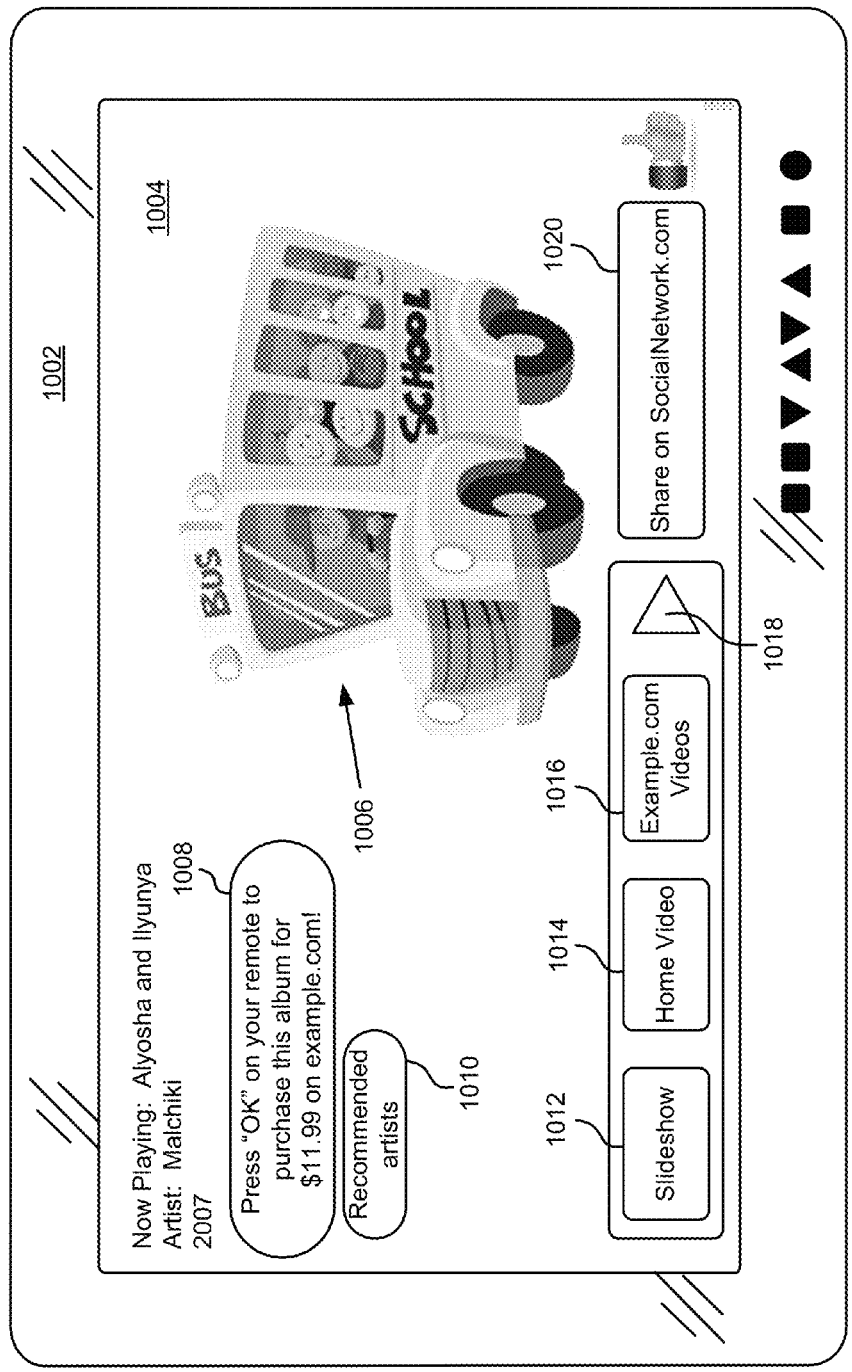
FIG. 10 shows an illustrative example of how content may be provided in accordance with at least one embodiment.

The description of the various embodiments above are provided for the purpose of illustration and many variations are considered as being within the scope of the present disclosure. Processes described above may be modified to combine content from different sources in various ways. FIG. 10, for example, shows an illustrative example of combined content that may have been obtained using techniques described above and variations thereof. In FIG. 10, a television 1002 is shown with various instances of content on a screen 1004 of the television 1002. As indicated in the upper left corner of the screen 1004, music is being played, either by the television 1002 or by another device. A video or picture 1006 is displayed on the screen 1004. The video or picture 1006, as noted, may be from a local source or a remote source. The music and video or picture 1006 may have been determined to match one another using techniques described above and may have been combined accordingly.

As illustrated in FIG. 10, an interface may also be included on the screen 1004 that enables a user to take various actions by selecting corresponding selectable options of the interface. One or more of the options on the interface may have been provided and may be identified utilizing the various techniques described above, and additional techniques. For instance, the song that is currently being played, as illustrated in FIG. 10, may be identified and an option 1008 to purchase an album containing the song may be provided. Similarly, an option 1010 is provided to enable a user to identify songs or artists that are related to the music that is currently playing. Selection for the option for purchasing the album or for obtaining recommendations may cause a message to be sent to a remote service that allows the user to purchase the album or view the recommended artists, respectively. For example, an http request identifying the currently playing music may be sent to a third-party remote service. The third-party remote service may access its own data store and provide a recommendation in response. A recommendation may be displayed on a screen 1004 upon user selection of the recommended artists option. Similarly, an interface of an electronic marketplace may appear, if the user had selected the option 1008 to purchase the album.

Other options on the screen 1004 include options for how the user wishes to combine content. For instance, a slideshow option 1012 allows a user to play a slideshow that is related to the music currently playing. The slideshow may be determined in accordance with the above description. That is, a set of pictures may be identified that match the currently playing music. If additional music is queued for playing (such as in a playlist), pictures for songs in the queue that will play in the future may be also identified so that, as the music changes, the pictures remain relevant to the music playing. For example, if the music changes from Hawaiian music genre to a country-western genre, pictures may change accordingly, such as from pictures from a Hawaiian vacation to pictures from a family visit to the country. If video is being matched, videos may be selected to play with the music as it changes accordingly. If it is not known in advance what the next song will be (such as if the song is being streamed by an audio streaming service that does not provide a playlist in advance), content that matches music may be determined as soon as the music is identified.

A home video option 1014 may allow a user to view the home video that is identified using the techniques above. The home video may be stored on a local device (such as a digital camcorder or a storage drive) or may be stored remotely on a third-party device such as by a remote storage device of a third-party video streaming service. Videos that are not necessarily home videos may also be provided, using a third-party video option 1016. As noted, whatever option is selected, appropriate content may be selected and combined such that the selected content matches music that may change over time.

Various navigational options may be provided on the screen 1004. For example, an arrow navigation option 1018 may allow a user to view additional options for obtaining content that is related to the music currently playing. Other features considered being within the scope of the present disclosure include interaction with various services such as social network services. For instance, a social network sharing option 1020 allows the user to post on a social networking account information about the content currently being consumed. For example, a music and slideshow combination that has been generated in accordance with the techniques described herein may be shared, using a social networking service. Those connected with a user by a social network may, for example, be able to view the slideshow and music, which may be streamed to those friends over a public communications network such as the Internet. In the interface shown in FIG. 10, and generally any interface that may be utilized herein, may be navigated in various ways. Some suitable techniques for navigation are described in application Ser. No. 13/284,668, entitled "Remote Control System for Connected Devices," and filed on Oct. 28, 2011 and also U.S. Application No. 61/480,849, entitled "Remote Control for Connected Devices," and filed on Apr. 29, 2011.

Figure 11:
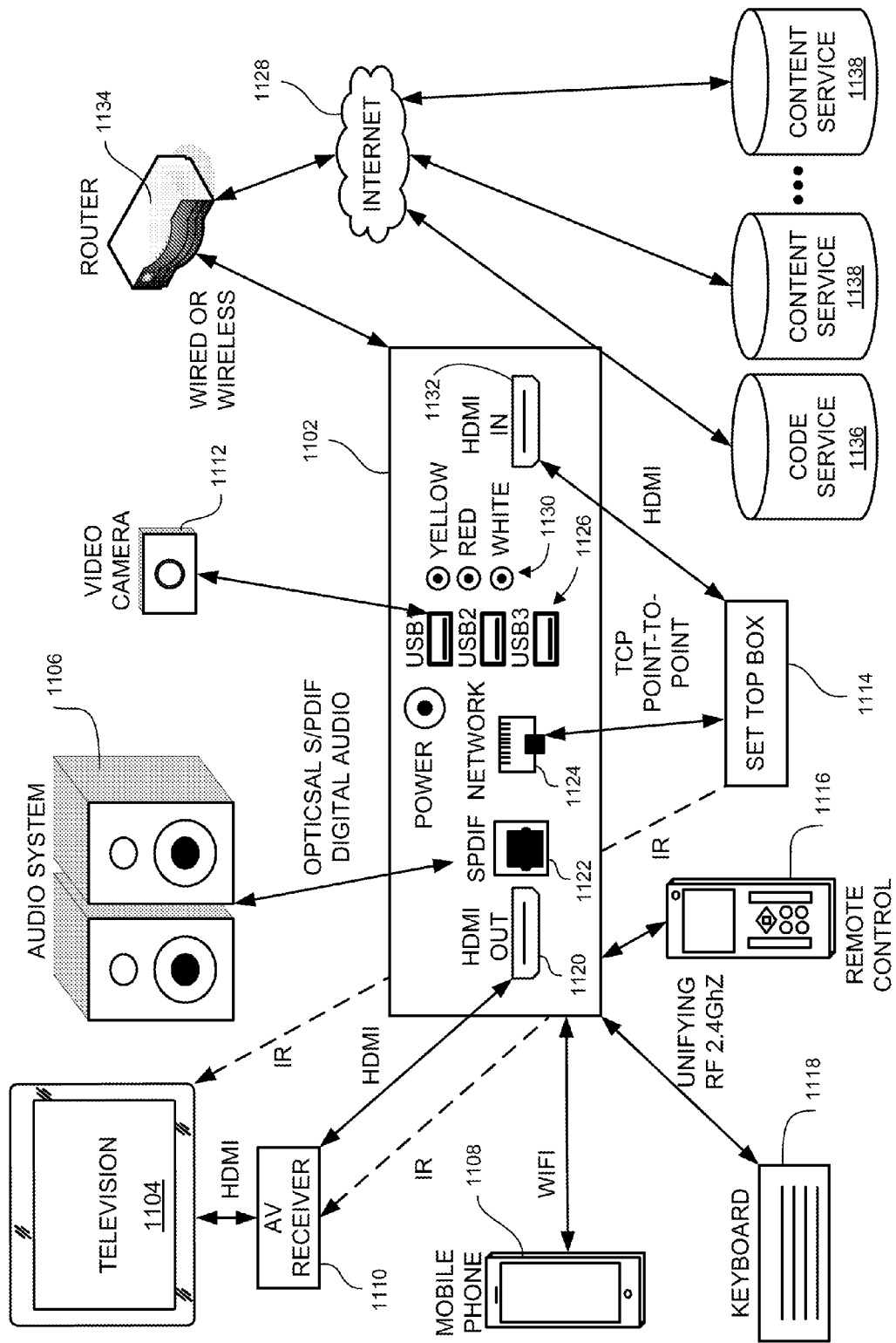
FIG. 11 shows an illustrative environment including a plurality of devices configured to communicate with a content appliance according to aspects of the invention.

As noted above, various environments may be used to practice embodiments of the present invention. FIG. 11, for example, shows another environment 1100 in which various embodiments may be practiced. In accordance with an embodiment, environment 1100 utilizes a content appliance 1102 in order to provide content to a user. As illustrated in FIG. 11, the content may be provided to the user in various ways. For example, the environment 1100 in FIG. 11 includes a television 1104, a audio system 1106 and mobile phone 1108 may be used to provide content to a user. Content may include video content, audio content, text content, and generally any type of content that may be provided audio, visually or otherwise to a user. Other devices may also be used in the environment 1100. For example, as illustrated in environment 1100 includes an audio visual (AV) receiver 1110 which operates in connection with television 1104. Also, the environment 1100 as illustrated in FIG. 11 includes a video camera 1112, a set top box 1114 and a remote control 1116 and a keyboard 1118.

When a user utilizes an environment, such as the environment 1100, one or more devices may utilize the content appliance 1102 in some manner. To accomplish, the various devices shown in FIG. 11 are configured to communicate with one another according to various protocols. As a result, in an embodiment, the content appliance 1102 is configured to communicate with various devices utilizing the different methods, such as according to the methods and protocols illustrated in FIG. 11. For example, in an embodiment, the content appliance 1102 is configured to generate and transmit infrared (IR) signals to various devices that are configured to receive IR signals and perform one or more functions accordingly. Different devices may utilize different codes and the content appliance may be configured to generate proper codes with each appliance. For example, a television from one manufacturer may utilize different codes in a television from another manufacturer. The content appliance 1102 may be configured accordingly to generate a transmit appropriate codes. The content appliance may include a data store that has the codes for various devices and codes may be obtained from remote sources, such as from remote databases as discussed below. In a set up process, a user may configure the content appliance 1102 to submit the correct codes to the appropriate device(s).

As another example of how the content 1102 is able to communicate utilizing various protocols, the content appliance 1102 includes various ports which may be used to connect with various devices. For example, in an embodiment, the content appliance 1102 includes an HDMI OUT port 1120 which may be used to provide content through an HDMI cable to another device. For example, as illustrated in FIG. 11, the HDMI OUT port 1120 communicates content to the AV receiver 1110. The HDMI OUT port may be used to provide content to other devices, such as directly to the television 1104. In an embodiment, the content appliance 1102 includes an S/PDIF port 1122 to communicate with the audio system 1106.

An ethernet port 1124 may be provided with the content appliance 1102 to enable the content appliance 1102 to communicate utilizing an appropriate networking protocol, such as illustrated in FIG. 11. For example, the content appliance 1102 may communicate signals utilizing the ethernet port 1124 to communicate to a set top box. The set top box may operate according to an application of a content provider such as a satellite or cable television provider. Use of the ethernet port 1124 of the content appliance 1102 may be used to instruct the set top box 1114 to obtain content on demand.

In an embodiment, the content appliance 1102 includes one or more universal serial bus (USB) ports 1126. The USB ports 1126 may be utilized to communicate with various accessories that are configured to communicate utilizing a USB cable. For example, as shown in FIG. 11, the content appliance 1102 communicates with a video camera 1112. The video camera 1112 may be used, for instance, to enable use of the content appliance to make video calls over a public communications network, such as the Internet 1128. Generally, the content appliance 1102 may be configured to communicate with any device connectable using USB techniques.

Other ports on the content appliance 1102 may include RCA ports 1130 in order to provide content to devices are configured to communicate using such ports and an HDMI end port 1132 which may be used to accept content from another device, such as by from the set top box 1114. Generally, the content appliance 1102 may have additional ports to those discussed above and, in some embodiments, may include less ports than illustrated.

Various devices in communication with the content appliance may be used to control the content appliance and for other devices. For example, the remote control 1116 may communicate with the content appliance 1102 utilizing radio frequency (RF) communication. As described in more detail below, the remote control 1116 may include a touch screen that may be used in accordance with the various embodiments described herein.

A keyboard 1118 may also communicate with the content appliance 1102 utilizing RF or another method. The keyboard may be used for various actions, such as navigation on a interface displayed on the television 1104, user input by a user typing utilizing the keyboard 1118, and general remote control functions. For example, an interface displayed on the television 1104 may include options for text entry. The user may type text utilizing keyboard 1118. Keystrokes that the user makes on the keyboard 1118 may be communicated to the content appliance 1102, which in turn generates an appropriate signal to send over an HDMI cable connecting the HDMI OUT port 1120 to the AV receiver 1110. The AV receiver 1110 may communicate with television 1104 over HDMI or another suitable connection to enable the television to display text or other content that corresponds to the user input. The keyboard 1118 may also include other features as well. For example, the keyboard 1118 may include a touchpad, such as described below or generally touchpad that may allow for user navigation of an interface displayed on a display device.

In an embodiment, the mobile phone 1108 is also able to control the content appliance 1102 (and possibly other devices, either directly, or through the content appliance 1102). The mobile phone may include remote control application that provides an interface for controlling the content appliance 1102. In this particular example from FIG. 11, the mobile phone 1108 includes a touch screen that may be used in a manner described below. As the user interacts with the mobile phone 1108, the mobile phone may communicate with the content appliance 1102 over wi-fi utilizing signals that correspond to the user's interaction with the mobile phone 1108. The content appliance 1102 may be, for instance, configured to receive signals from the mobile phone over wi-fi (directly, as illustrated, or indirectly, such as through a wireless router or other device). The content appliance may be configured to generate signals another type (such as IR, HDMI, RF, and the like) that correspond to codes received over wi-fi from the mobile phone 1108 and then generate and transmit signals accordingly. An application executing on the mobile phone 1108 may provide a graphical user interface that allows users to use the mobile phone 1108 as a remote control and generate such codes accordingly. The mobile phone 1108 (and other devices), as illustrated, may be configured to receive information from the content appliance 1102 and reconfigure itself according to the information received. The mobile phone 1108 may, for example, update a display and/or update any applications executing on the mobile phone 1108 according to information received by the content appliance 1102. It should be noted that, while the present disclosure discusses a mobile phone, the mobile phone may be a different device with at least some similar capabilities. For example, the mobile phone may be a portable music player or tablet computing device with a touch screen. Of course, such devices (and other devices) may be included additionally to a mobile phone in the environment illustrated in FIG. 11.

In an embodiment, the content appliance 1102 is also configured to utilize various services provided over a public communications network, such as the Internet 1128. As example, the content appliance 1102 may communicate with a router 1134 of home network. The content appliance 1102 and the router 1134 may communicate utilizing a wired or wireless connection. The router 1134 may be directly or indirectly connected to the Internet 1128 in order to access various third-party services. For example, in an embodiment, a code service 1136 is provided. The code service in an embodiment provides codes for the content appliance 1102 to control various devices to enable the content appliance 1102 to translate codes received from another device (such as the remote control 1116, the keyboard 1118, and/or the mobile phone 1108). The various devices to control may be identified to the content appliance 1102 by user input or through automated means. The content appliance 1102 may submit a request through the router 1134 to the code service 1136 for appropriate codes. The codes may be, for example, IR codes that are used to control the various devices that utilize IR for communication. Thus, for example, if a user presses a button on the remote control 1116, keyboard 1118, or an interface element of the mobile phone 1108, a signal corresponding to the selection by the user may be communicated to the content appliance 1102. The content appliance 1102 may then generate a code based at least in part on information received from the code service 1136. As an illustrative example, if the user presses a play button of the remote control 1116, a signal corresponding to selection of the play button may be sent to the content appliance 1102 which may generate a play IR code, which is then transmitted to the television 1104 or to another suitable appliance, such as generally any appliance from context that is able to play content.

Other services that may be accessed by the content appliance 1102 over the Internet 1128 include various content services 1138. The content services may be, for example, any information resource, such as websites, video-streaming services, audio-streaming services and generally any services that provide content over the Internet 1128. In addition, many of the devices illustrated in FIG. 11 are illustrated as separate devices. However, capabilities of various devices may be combined. For example, in an embodiment, the content appliance 1102 is configured to function as a router and/or modem. The content appliance 1102, in this example, may perform some or all of the functions of a wireless router. As another example, one or more devices may be configured to perform functions of the content appliance. For example, functions described as being performed by the content appliance 1102 may be performed by one or more other devices. The content appliance 1102 may be, for instance, built into the AV receiver 1110 and/or the television 1104.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of providing content, comprising:
   under the control of one or more computer systems configured with executable instructions,
   obtaining information associated with first content of a first content type, the first content from a first content source;
   identifying, based at least in part on the obtained information, second content comprising a content set that includes a plurality of content instances for at least one second content source; and
   causing a set of one or more electronic devices to collectively and simultaneously present the first content and at least some of the second content.

2. The computer-implemented method of claim 1, wherein:
   the first content is content generated using a device of a user;
   the first content source is local to the user;
   the information associated with the first content is metadata encoded by the first content;
   the second content is of a second content type; and
   the first content type and second content type are different media types.

3. The computer-implemented method of claim 1, wherein the first content is audio content.

4. The computer-implemented method of claim 1, wherein the identified content set includes a plurality of images.

5. The computer-implemented method of claim 4, wherein presenting the first content and at least some of the second content includes sequentially displaying the images while presenting the first content.

6. The computer-implemented method of claim 1, wherein one of the first content source and the second source is a local data store and the other of the first content source and second content source is a remote data store.

7. The computer-implemented method of claim 1, wherein the one or more computer systems are a television.

8. The computer-implemented method of claim 1, wherein the obtained information is metadata of a file that encodes the first content.

9. The computer-implemented method of claim 1, wherein the one or more computer systems is a device that obtains the first content and second content and causes at least one of the first content and second content to be displayed on a television.

10. A computer-implemented method of providing content, comprising:
    under the control of one or more computer systems configured with executable instructions,
    obtaining information about first content;
    identifying, based at least in part on the obtained information, second content, the second content being configured to change over time when presented; and
    causing a set of one or more electronic devices to collectively and simultaneously present the first content and second content.

11. The computer-implemented method of claim 10, wherein the first content is audio content.

12. The computer-implemented method of claim 10, wherein the second content is video content.

13. The computer-implemented method of claim 10, further comprising obtaining the first content and second content from different sources.

14. The computer-implemented method of claim 13, wherein one of the first content and second content is obtained from a local source and wherein the other of the first content and the second content is obtained from a remote source.

15. The computer-implemented method of claim 10, wherein the information includes tags associated with the first content in a data store.

16. The computer-implemented method of claim 10, wherein the information includes metadata of a file that encodes the first content.

17. The computer-implemented method of claim 10, wherein the one or more computer systems are a television and wherein causing the set of one or more electronic devices to present the first content and second content includes displaying at least one of the first content and second content on the television.

18. The computer-implemented method of claim 10, wherein the one or more computer systems are communicatively connected with a display device and wherein causing the set of one or more electronic devices to present the first content and second content includes providing the first content and second content to the display device for display.

19. The computer-implemented method of claim 10, wherein the second content includes a recommendation for third content.

20. A system for providing content, comprising:
one or more processors; and
memory, including instructions executable by the one or more processors that, when executed collectively by the one or more processors, cause the system to at least:
match first content from a first content source selected by a user with second content from a second content source, the second content source being a local content source of the user; and
cause the first content and second content to be provided to the user simultaneously,
wherein matching the first content with the second content includes:
obtaining metadata of the first content;
causing a search to be performed based at least in part on the obtained metadata; and
obtaining one or more results of the performed search that identify the second content.

21. The system of claim 20, wherein causing the first content and second content to be provided to the user includes causing a television to display at least one of the first content and second content.

22. The system of claim 21, wherein the system and television are separate devices.

23. The system of claim 20, wherein the first content is content generated by the user.

24. The system of claim 20, wherein the second content is content generated by the user.

25. The system of claim 20, wherein the system is configured to maintain an index of a collection of content and wherein matching the first content to the second content includes identifying the second content using the index.

* * * * *